V. H. LYON.
Dumping Wagon.
No. 101,030. Patented March 22, 1870.
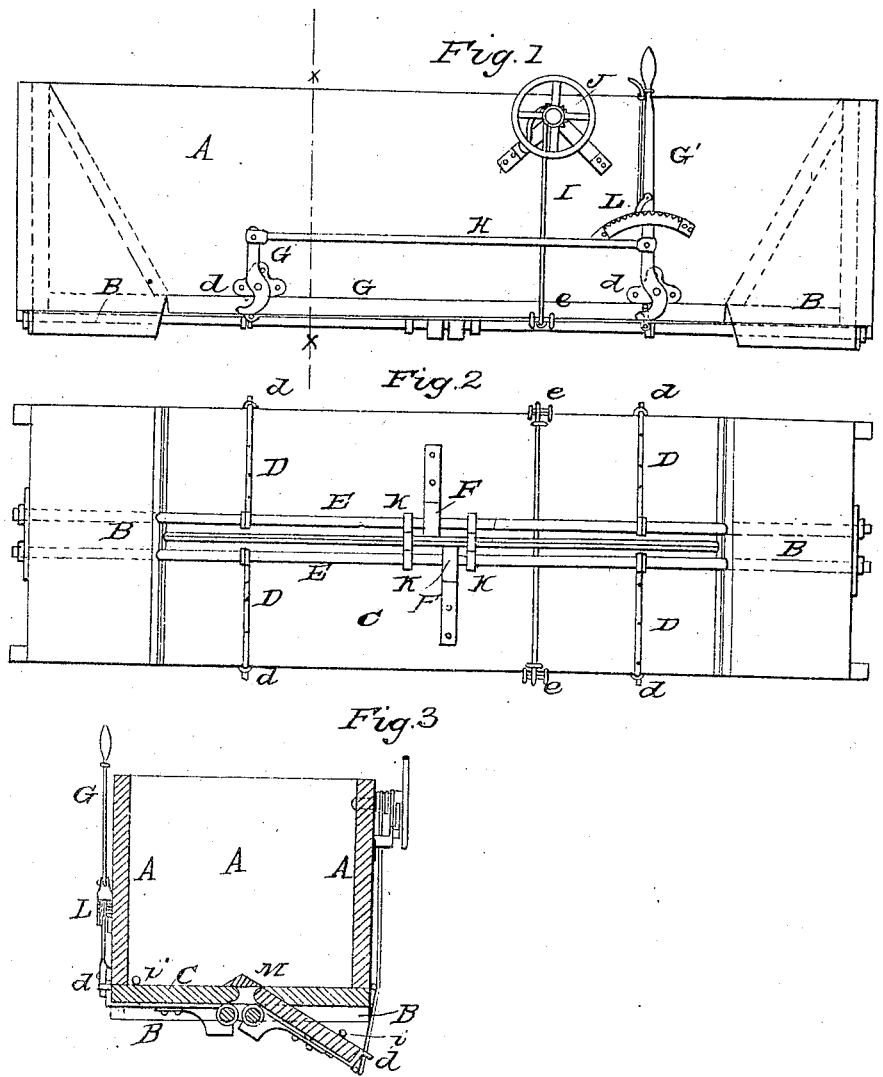
WITNESSES
Dan. W. Knefler
O. F. Mayhew
INVENTOR
Virgil H. Lyon

United States Patent Office.

VIRGIL H. LYON, OF PLAINFIELD, ASSIGNOR TO HIMSELF AND JESSE L. SNIPES, OF INDIANAPOLIS, INDIANA.

Letters Patent No. 101,030, dated March 22, 1870.

IMPROVEMENT IN DUMPING-WAGONS.

The Schedule referred to in these Letters Patent and making part of the same

I, VIRGIL H. LYON, of Plainfield, in the county of Hendricks and State of Indiana, have invented certain Improvements in Dumping-Wagon or Car-Beds, of which the following is a specification.

Nature and Objects of the Invention.

My invention relates to construction and mode of hanging the bottoms of wagons and car-beds, combined with hooked levers fixed to the side of the bed for holding them closed, in such a manner that the levers may be easily and conveniently operated by the driver, while in his seat on the wagon, to release the bottom and instantly dump the contents, when desired.

Description of the Accompanying Drawings.

Figure 1 is a side elevation of a wagon-bed, embodying my invention.

Figure 2 is a view of the bottom of the same.

Figure 3 is a vertical transverse section of the bed, the lever on one side being left off to more clearly show the device for closing up the leaves forming the bottom.

General Description.

A are the side and end pieces of the bed, and

B, that portion of the bottom at each end permanently fixed and designed to rest upon the axles of the wagon or car.

The remainder of the bottom is composed of the two leaves C C, hung by the hinges D to the longitudinal rods E, the ends of which are fixed in the end pieces B. The hinges by which the leaves are hung upon the rods are situated near their ends, so as to avoid springing them, and the leaves rest upon the tops of the rods throughout their length, which prevents them from sagging under heavy weight.

F are stops fixed to the under side of the leaves, their inner ends being formed and arranged as shown in fig. 3, so as to engage with the opposite rod, when the leaves have fallen down the proper distance to discharge the load.

The outer ends of the hinges D are turned up around the outer edge of the leaves, the extreme end being formed into studs, d, at the upper edge of the leaf, with which the hooks on the lower ends of levers G engage to hold the leaves up.

The levers G G' are attached, as shown, to the side of the bed, their lower ends being furnished with hooks that engage with the studs d, the upper edge of the hooks being so formed as to draw the leaves firmly up against the sides of the bed.

A bar, H, connects the top of the short lever G to about the same height on the long hand-lever G', the latter extending to the top of the bed, in convenient reach of the driver, so that both levers may be operated simultaneously. These levers are similarly arranged on both sides of the bed, so that either leaf may be let down separate, or both together.

The inner edges of the leaves, where they meet in the center of the bed, are covered with a solid roof-shaped strip of wood, M, to prevent gravel from getting into the opening between the leaves.

In cars, or other vehicles designed to carry heavy loads, and when the leaves C are heavy, they may be raised up to their horizontal position against the bed by means of a chain, I, attached by one end to one side of the bed, and passing under the leaves upon the other side to a reel, J, furnished with ratchet and pawl, by which to wind it up. The chain runs on rollers, e, attached to the leaves, on the under side, near their edges, and passes between the leaves and rods through grooves cut in the leaves to keep it in place.

But, for light vehicles, the leaves may be furnished with a staple or eye at i, and the driver uses a hook to raise them up, when they are to be secured by the levers G G', thereby dispensing with the chain I and reel J.

K are collars fixed on the rods E, which serve both to keep the rods from spreading apart and the leaves from moving longitudinally.

It will be readily understood that by removing the cant-boards, shown in dotted lines in fig. 1, the bed may be used for ordinary purposes.

The manner in which the leaves C are constructed and hung admits of lateral expansion and contraction, and also allows them to expand and contract in thickness, and the latter may be compensated for by the adjustment of the lever G'.

Claim

I claim as my invention—

Constructing and hanging the bottoms of wagons, cars, &c., composed of two leaves, C, furnished with the stops F, to the rods E, the space between, which is covered by the roof-shaped strip M, substantially as and for the purpose set forth, and in combination therewith the hooked levers G G', connected by the bar H, all arranged and operating substantially as set forth.

VIRGIL H. LYON.

Witnesses:
  DAN. W. KNEFLER,
  O. F. MAYHEW.